US009729669B2

(12) United States Patent
Varvello et al.

(10) Patent No.: US 9,729,669 B2
(45) Date of Patent: Aug. 8, 2017

(54) METHOD AND SYSTEM FOR FAST AND LARGE-SCALE LONGEST PREFIX MATCHING

(75) Inventors: Matteo Varvello, Port Monmouth, NJ (US); Diego Perino, Issy-les-Moulineaux (FR); Jairo Esteban, Freehold, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 509 days.

(21) Appl. No.: 13/421,379

(22) Filed: Mar. 15, 2012

(65) Prior Publication Data
US 2013/0242996 A1    Sep. 19, 2013

(51) Int. Cl.
| | |
|---|---|
| H04L 29/08 | (2006.01) |
| H04L 12/743 | (2013.01) |
| H04L 12/751 | (2013.01) |
| H04L 12/721 | (2013.01) |
| H04L 12/741 | (2013.01) |

(52) U.S. Cl.
CPC ............ *H04L 67/327* (2013.01); *H04L 45/02* (2013.01); *H04L 45/26* (2013.01); *H04L 45/54* (2013.01); *H04L 45/7453* (2013.01)

(58) Field of Classification Search
CPC .......... H04L 45/00–45/04; H04L 45/26; H04L 45/50–45/54; H04L 45/74–45/748
USPC ................. 370/230, 231, 235, 389, 392–393, 370/396–397, 395.3, 395.31, 395.32, 370/395.54, 395.7–395.72, 409
See application file for complete search history.

(56) References Cited

U.S. PATENT DOCUMENTS

| | | | |
|---|---|---|---|
| 6,614,765 B1 | 9/2003 | Bruno et al. | |
| 2003/0169745 A1 | 9/2003 | Gooch | |
| 2007/0002869 A1 | 1/2007 | Miller | |
| 2007/0014278 A1 | 1/2007 | Ebbesen et al. | |
| 2010/0195653 A1* | 8/2010 | Jacobson et al. ............ | 370/392 |
| 2011/0286459 A1* | 11/2011 | Rembarz et al. ............ | 370/392 |

(Continued)

FOREIGN PATENT DOCUMENTS

| | | |
|---|---|---|
| EP | 0915594 A2 | 5/1999 |
| EP | 1408659 A1 | 4/2004 |
| EP | 2159708 A1 | 3/2010 |

(Continued)

OTHER PUBLICATIONS

V. Fuller, T. Li, J. Yu, and K. Varadhan. Classless inter-domain routing (cidr): an address assignment and aggregation strategy.

(Continued)

*Primary Examiner* — Eric Myers
(74) *Attorney, Agent, or Firm* — Kramer & Amado, P.C.

(57) ABSTRACT

Various exemplary embodiments relate to a method and related network node including one or more of the following: receiving, at the first network device, a message to be forwarded; determining a destination address for the message; determining whether the destination address is assigned to the first network device; if the destination address is not assigned to the first network device, querying a second network device for a next hop of the destination address; receiving, in response to the query, an indication of the next hop for the destination address; and forwarding, by the first network device in response to the indication of the next hop, the message to the next hop.

13 Claims, 5 Drawing Sheets

(56) References Cited

U.S. PATENT DOCUMENTS

| | | | |
|---|---|---|---|
| 2012/0158912 A1* | 6/2012 | Jacobson | 709/219 |
| 2012/0158973 A1* | 6/2012 | Jacobson et al. | 709/227 |

FOREIGN PATENT DOCUMENTS

| | | |
|---|---|---|
| JP | 2004129156 A | 4/2004 |
| JP | 2009157575 A | 7/2009 |
| JP | 2010256749 A | 11/2010 |

OTHER PUBLICATIONS

M. Gritter and D. Cheriton. An Architecture for Content Routing Support in the Internet. In USITS'01, SFO, CA, USA, Mar. 2001.

V. Jacobson, D. K. Smetters, J. D. Thronton, M. F. Plass, N. H. Briggs, and R. L. Braynard. Network Named Content, in CoNEXT '09, Rome, Italy, Dec. 2009.

T. Koponen, M. Chawla, B.-G. Chun, A. Ermolinskiy, K. Kim, S. Shenker, and I. Stoica. A Data-Oriented (and Beyond) Network Architecture. In SIGCOMM '07, Kyoto, Japan, Aug. 2007.

D. Perino and M. Varvello. A reality check for content centric networking. In ICN'11, Toronto, Canada, Aug. 2011.

S. Dharmapurikar, P. Krishnamurthy, and D. E. Taylor. Longest prefix matching using bloom filters. In SIGCOMM '03, Karlsruhe, Germany, Aug. 2003.

S. Podlipnig and L. Böszörmenyi. A survey of web cache replacement strategies. ACM Comput. Surv., 35(4), 2003.

M. Luoma. Classless Inter Domain Routing—CIDR. http://www.google.com/url?sa=t&rct=j&q=&esrc=s&source=web&cd=9
&cts=1331242689716&ved=0CF8QFjAI
&url=http%3A%2F%2Fmarco.uminho.
pt%2Fdisciplinas%2FST%2Fcidr.pdf
&e=4yVZT5WpHYKI0QW82_jBDQ
&usg=AFQjCNHCo93wTN5m-ErxV9FsByON_YH92A.

International Search Report for PCT/US2013/030164 dated Jun. 24, 2013.

Preliminary Rejection for Korean Patent Application No. 2014-7025585 dated Jan. 27, 2015.

"Japan Examiners Decision of Rejection dated Feb. 9, 2016".

Dishi, et al., "A Study of Dynamic Control Mechanism for Distributed Information Management", Study of Engineering, Apr. 7, 2009, 753-758.

* cited by examiner

| | Content Name | Next Hop |
|---|---|---|
| 330 | /JDOE/PAPERS/PaperA.pdf | d |
| 340 | /JDOE/notes.txt | b |
| 350 | ... | ... |

| | Content Name | Packet | Delegation | Timestamp |
|---|---|---|---|---|
| 450 | /TUX/notes.txt | <Packet149> | Local | 1330774815 |
| 460 | /JDOE/VIDEOS/abc.mpg | <Packet150> | Remote | 1330774818 |
| 470 | ... | ... | ... | ... |

| | Prefix Length | Filter |
|---|---|---|
| 530 | 1 | 0x91B206 |
| 540 | 2 | 0xC4E231 |
| 550 | ... | ... |

| | Content Name | Next Hop (0xA2) | Next Hop (0x35) | ... |
|---|---|---|---|---|
| 650 | /JDOE | a | b | ... |
| 660 | /JDOE/VIDEOS | a | d | ... |
| 670 | ... | ... | ... | ... |

METHOD AND SYSTEM FOR FAST AND LARGE-SCALE LONGEST PREFIX MATCHING

TECHNICAL FIELD

Various exemplary embodiments disclosed herein relate generally to telecommunications networks.

BACKGROUND

The Internet has evolved from a medium to interconnect machines into a medium to connect machines with content such as videos and photos. While the Internet developed on top of various mechanics, such as routing information via IP address, future architectures may employ alternative mechanisms in view of the current state of the Internet. One common principle among many proposals is that these future architectures may be centered on the content provided, rather than the machines themselves.

Content-centric networking is a more recent paradigm where content is requested by name, rather than location. This paradigm may employ name-based routing, wherein a router may move traffic to a destination server based on the "content name." As such, Internet routers may be provided with explicit information as to the content being moved.

One result of name-based routing is that, while IP addresses are constrained in the number of variations and clustered geographically, content names may take on virtually any value and may point to a server located anywhere, regardless of the locations of servers hosting content with similar names. As such, the number of entries in a name-based routing table may be orders of magnitude larger than an IPv4 or IPv6 routing table. This presents new challenges in efficiently storing the table and quickly forwarding traffic using the table.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a first network device for forwarding a message, the method including one or more of the following: receiving, at the first network device, a message to be forwarded; determining a destination address for the message; determining whether the destination address is assigned to the first network device; if the destination address is not assigned to the first network device, querying a second network device for a next hop of the destination address; receiving, in response to the query, an indication of the next hop for the destination address; and forwarding, by the first network device in response to the indication of the next hop, the message to the next hop.

Various exemplary embodiments relate to a method performed by a first network device for assisting a second network device in forwarding a message, the method including one or more of the following: receiving, at the first network device, a query from the second network device, wherein the query includes a device identifier (ID) and a destination address; identifying, in response to receiving the query, a next hop for the message based on at least the device ID and the destination address, whereby the next hop is a next hop with respect to the second network device; transmitting, to the second network device, a response indicating the next hop.

Various exemplary embodiments relate to a network device including one or more of the following: a network interface configured to receive a message; and a delegation manager: determine a destination address associated with the message, determine whether the destination address is assigned to the network device, if the destination address is not assigned to the network device, query a second network device, via the network interface, for a next hop of the destination address, receive, in response to the query and via the network interface, an indication of the next hop for the destination address, and forward, in response to the indication of the next hop, the message to the next hop via the network interface.

Various embodiments are described wherein the step of determining whether the destination address is assigned to the first network device includes: performing a hash function on the destination address to produce a hash key; identifying a network device identification (ID) of a plurality of network device IDs that is closest to the hash key; and determining whether the identified network device ID is associated with the first network device.

Various embodiments are described wherein the identified network device ID is associated with the second network device.

Various embodiments are described wherein the step of performing a hash function includes: identifying a first component and a second component of the destination address; hashing the first component; hashing the second component independently of the step of hashing the first component; and combining at least the hashed first component and the hashed second component to produce the hash key.

Various embodiments may additionally include determining whether the first network device stores a cache entry in association with the destination address; and adding a new cache entry, at the first network device in response to the indication of the next hop, in association with the destination address and based on the indication of the next hop, wherein the step of determining whether the destination address is assigned to the first network device is performed when the first network device does not store a cache entry in association with the destination address.

Various embodiments are described wherein the destination address is a content name.

Various embodiments additionally include adding the message to a pending route table; and retrieving the message from the pending route table in response to receiving the indication of the next hop for the destination address.

Various embodiments additionally include receiving, at the first network device, a route update message, wherein the route update message includes the destination address; identifying a next hop, for the first network device, associated with the route update message; determining, in response to receiving the route update message, whether the destination address is assigned to the first network device; and if the destination address is not assigned to the first network device, transmitting the next hop and destination address to the second network device.

Various embodiments additionally include receiving, at the first network device, a route update from the second network device, wherein the route update indicates at least a portion of the destination address and the next hop; and storing the at least a portion of the destination address and the next hop at the first network device in association with the second network device.

Various embodiments are described wherein the first network device is a router.

Various embodiments are described wherein the step of identifying a next hop for the message based on at least the device ID and the destination address includes: performing longest prefix matching based on the destination address to identify a matching routing record; and identifying a field of the matching routing record associated with the device ID; using a value of the identified field as the next hop.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

As described above, various emerging routing paradigms propose to expand the routing table used in routing traffic over the Internet and other networks. While larger tables may be accommodated by larger and faster memories and faster processors, this approach may be cost-prohibitive. Accordingly, it may be desirable to implement a method of route resolution that may distribute a routing table and/or various routing operations among multiple routers and/or other network devices. Various additional objects and benefits will be apparent in view of the following description. It will be apparent to those of skill in the art that, while various examples described herein are described with respect to name-based routing, the methods and systems described may be useful in other environments such as, for example, routing according to IPv4 or IPv6 protocols.

Referring now to the drawings, in which like numerals refer to like components or steps, there are disclosed broad aspects of various exemplary embodiments.

Figure 1:
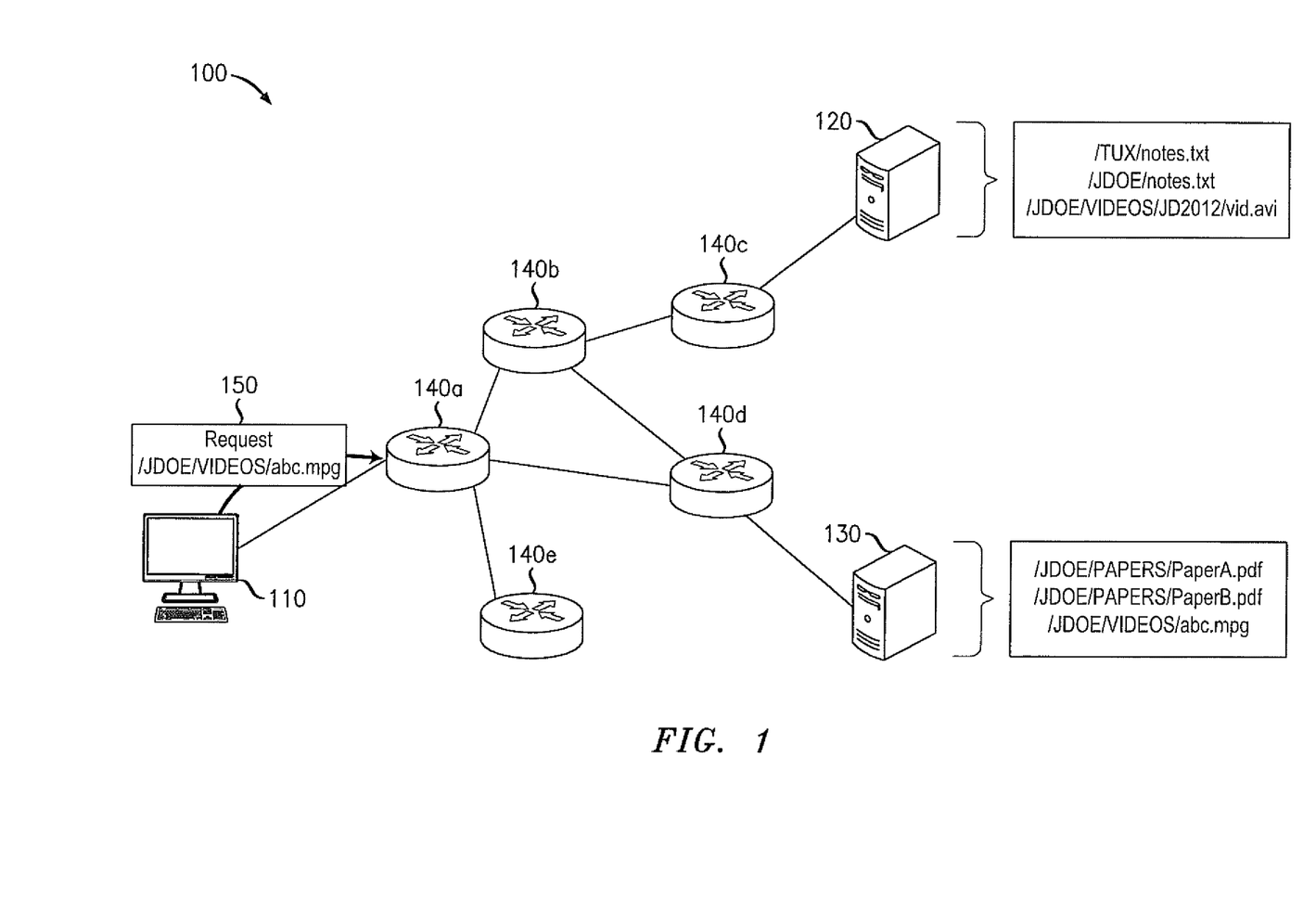
FIG. 1 illustrates an exemplary network for routing messages.

FIG. 1 illustrates an exemplary network 100 for routing messages. In various embodiments, exemplary network 100 may be the Internet or a portion thereof. It will be apparent to those of skill in the art that exemplary network 100 may constitute, in some respects, a simplification. For example, exemplary network 100 may include numerous additional clients, servers, routers, switches, and/or other network devices. As illustrated, exemplary network 100 may include a number of network devices: a client device 110, two servers 120, 130, and five routers 140*a-e*. As used herein, the term "router" may be understood to refer to any network device capable of receiving data messages and forwarding data messages toward their ultimate destination. Thus, the term "router" may encompass network devices operating at any layer of the OSI model of networks such as, for example, a switch (Layer 2) or a true router (Layer 3). Further, the term "message" will be understood to encompass any chunk of data transferred from one device to another such as, for example, a frame or a packet.

As shown, routers 140*a-e* may interconnect client device 110, server 120, and server 130, such that messages may be exchanged between these devices. As noted, exemplary network 100 may constitute a simplification and, as such, there may be a number of intermediate routers and/or other network devices (not shown) providing communication between those network devices that are illustrated. For example, router 140*c* may be connected to server 120 through one or more intermediate network devices (not shown).

Client device 110 may be any device capable of requesting and receiving content via a network. For example, client device 110 may include a personal computer, laptop, mobile phone, tablet, or other device. Servers 120, 130 may each be any device capable of receiving requests and serving content. For example, servers 120, 130 may each include a personal computer, stand-alone server, blade server, or other device. Servers 120, 130 may each host a number of content items, each item being identified by at least one content name. As illustrated, for example, server 120 may host three content items identified as "TUX/notes.txt," "JDOE/notes.txt," and "/JDOE/VIDEOS/JD2012/vid.avi." As another example, server 130 may also host three content items identified as "/JDOE/PAPERS/PaperA.pdf," "/JDOE/PAPERS/PaperB.pdf," and "/JDOE/VIDEOS/abc.mpg." Client device 110 may request the delivery of any of these items by sending a request message, which may then be routed by routers 140*a-e* to the appropriate server 120, 130. This routing may be performed based on the name of the content requested. Thus, the content name may be referred to as a destination address of the request message. The server may then use the request to locate the appropriate content and transmit the content back to client device 110 via routers 150*a-e*.

As an example, FIG. 1 illustrates client device 110 transmitting a request message 150 to router 140*a*. Request message 150 may include a destination address of "/JDOE/VIDEOS/abc.mpg." Thus, message 150 may request content stored by server 130. Upon receiving request message 150, router 140*a* may then perform various routing operations to determine to which router, or "next hop," the request message 150 should be forwarded in order to advance the request message 150 to its ultimate destination. To provide this capability, routers 140*a-e* may implement a distributed routing table. As such, each router 140*a-e* may include a portion of, but not the entire, routing table associated with this set of routers 140*a-e*. For example, each router 140*a-e* may be assigned a range of addresses assigned for which that router 140*a-e* may store the available routing records. In various alternative embodiments, network 100 may include one or more network devices that are not routers and that contain a portion of the distributed routing table. For example, network 100 may include a dedicated server (not shown) that stores a portion of the distributed routing table and assists routers 140*a-e* in forwarding messages in a manner similar to how routers 140*a-e* may provide assistance to other routers 140*a-e* in forwarding messages.

In various alternative embodiments, request message 150 may address a specific "chunk" of the content requested. For example, request message 150 may request "/JDOE/VIDEOS/abc.mpg/chunk2." In various such embodiments wherein all chunks for a particular content item are stored at the same location, the destination address used in processing the message may omit the chunk identifier, thus routing based on "/JDOE/VIDEOS/abc.mpg." In various alternative embodiments such as, for example, embodiments where content may be distributed among multiple servers, routers may route based on the chunk identifier as well, thus routing based on "/JDOE/VIDEOS/abc.mpg/chunk2" in this example.

Upon receiving request message 150, router 140*a* may determine to which router 140*a-e* the destination address "/JDOE/VIDEOS/abc.mpg" is assigned. After identifying the assigned router, router 140*a* may query that router for the appropriate next hop for request message 150. For example, router 140*a* may determine that the address "/JDOE/VIDEOS/abc.mpg" is assigned to router 140*e* and, in response, query router 140*e* for the appropriate next hop.

Upon receiving a query for a next hop, a router 140*a-e* may consult the locally-stored routing table to determine the appropriate next hop with respect to the network device that sent the query. Selection of a next hop may encompass a selection of an interface of the present device over which a message is to be forwarded. In various alternative embodiments, selection of a next hop may encompass a selection of the next router or other device to receive a forwarded message from the present device. Thus, the next hop for one router may not be the next hop for a different router. Continuing the example from above, the appropriate next hop for message 150 with respect to router 140*a* would be router 140*d*. If the message 150 were being forwarded by router 140*e*, however, the next hop with respect to that router would be router 140*a*. After determining the appropriate next hop for the message, the queried router may return a message including an indication of the next hop to the querying router. For example, router 140*e* may send a message to router 140*a* indicating that router 140*d* is the next hop for message 150*a*. Router 140*a* may then proceed to transmit the message 150 to router 140*d*, where the process may repeat itself, this time with respect to router 140*d* instead of router 140*a*.

The foregoing description is presented as an overview of an exemplary operation of network 100 and may constitute a simplification and/or abstraction in some respects. A more detailed operation of exemplary network 100 and one or more of routers 140*a-e* will now be presented with respect to FIGS. 2-10.

Figure 2:
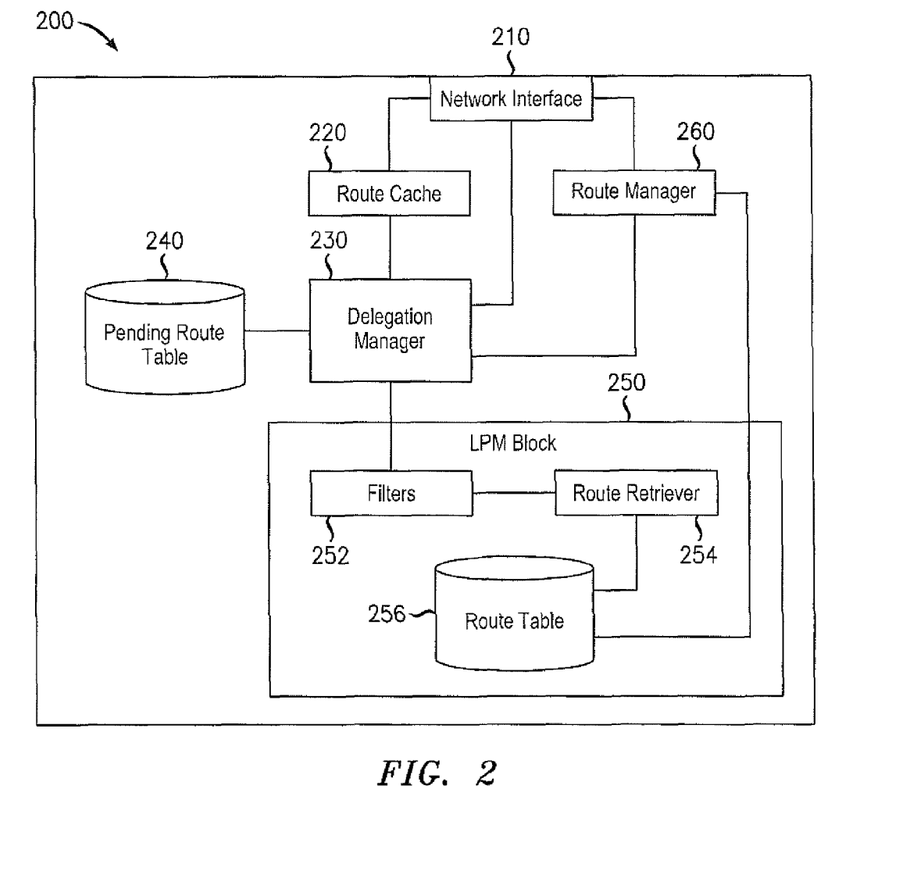
FIG. 2 illustrates an exemplary network device for routing messages.

FIG. 2 illustrates an exemplary network device 200 for routing messages. Exemplary network device 200 may correspond to one or more of routers 140*a-e* of exemplary network 100. It will be apparent to those of skill in the art that network device 200 may be abstracted in some respects and that network device 200 may include various hardware components such as various memories and one or more processors such as, for example, microprocessors, field-programmable gate arrays (FPGAs), and/or application-specific integrated circuit (ASICs). As illustrated, network device 200 may include a network interface 210, route cache 220, delegation manager 230, pending route table 240, longest prefix match (LPM) block 250, and/or route manager 260.

Network interface 210 may be an interface including hardware and/or executable instructions encoded on a machine-readable storage medium configured to communicate with at least one other network device, such as a client device, server, and/or router. Network interface may include multiple physical ports for enabling communication with multiple devices. In various embodiments, network interface 210 may include one or more interfaces that communicate according to a protocol such as Ethernet, Frame Relay, ATM, and/or PPP. In operation, network interface may receive and transmit various messages such as request messages, content messages, route update messages, query messages, and/or response messages. In various embodiments, network interface 210 may include multiple physical interfaces. Further, in some such embodiments, different interfaces may be associated with different types of messages. For example, a node may include a dedicated interface for sending and receiving query and response messages, separate from those interfaces used to send and receive content messages.

Route cache 220 may include hardware and/or executable instructions on a machine-readable storage medium configured to store and utilize cached routes. For example, route cache may include a relatively fast memory, such as an SRAM, that stores cache entries in association with various destination addresses. Each cache entry may specify an appropriate next hop with respect to the network device 200 for each of the cached destination addresses. In various alternative embodiments, cache entries may additionally specify next hops with respect to network devices other than network device 200. Route cache 220 may employ various caching techniques for selecting and maintaining entries in the cache. Exemplary contents of route cache 220 will be described in greater detail below with respect to FIG. 3.

Route cache 220 may receive various messages to be forwarded to other network devices via network interface 210. For example, route cache 220 may receive request messages and content messages via network interface 210. Upon receiving such a message, route cache 220 may extract the destination address from the message and determine whether route cache 220 stores a cache entry in association with the extracted address. If so, route cache may simply forward the received message via network interface 210 to the appropriate next hop, as identified by the matching cache entry. For example, the matching cache entry may identify one of a plurality of outgoing ports over which the message should be transmitted. If there is no cache hit for the destination address, route cache 220 may pass the received message to delegation manager 230 for further processing.

Delegation manager 230 may include hardware and/or executable instructions on a machine-readable storage medium configured to determine whether the destination address is "assigned" to network device 200 or another network device. As used herein, a destination address may be assigned to a network device when that network device is responsible to manage route updates and perform longest prefix matching operations on behalf of other nodes with respect to that destination address. For example, as will be described in greater detail below with respect to FIG. 10, delegation manager 230 may perform a hash function on the destination address to generate a hash key. Delegation manager 230 may then compare this hash key to various network device identifiers (IDs) assigned among network device 200 and various other network devices. In various embodiments, each device may be assigned a single device identifier for this purpose. Based on this comparison, delegation manager may determine that the network device ID that most closely matches the hash key points to the network device to which the destination address is assigned. If this network device ID points to network device 200, delegation manager 230 may forward the destination address to LPM block 250 for locally determining the appropriate next hop. Otherwise, the delegation manager 230 may generate and transmit a query message including the destination address to request the appropriate next hop from the network device to which the matching network device ID points. Delegation manager 230 may then store the message in pending route table 240 and proceed to process additional messages as it awaits receipt of the appropriate next hop. Upon receiving the appropriate next hop from either LPM block 250 or the remote network device via network interface 210, delegation manager may retrieve the message from pending route table 240 and forward the message to the next hop via network interface 210.

Delegation manager 230 may further be configured to assist other network devices in forwarding messages. For example, delegation manager 230 may receive query messages from other network devices via network interface 210. In response, delegation manager may extract a destination address and network device ID of the querying network device and pass this information to LPM block 250 for further processing, as will be described below. Upon receiving a next hop with respect to the querying network device, delegation manager may generate and transmit a response message including the determined next hop. In various alternative embodiments, prior to interrogating LPM block 250, route cache 220 may determine whether a cached entry exists that indicates the appropriate next hop with respect to the querying network device. Further, in various alternative embodiments, delegation manager 230 may perform a process similar to that described above to determine whether the query message should be processed locally, to determine whether the query message may have arrived at network device 200 by mistake. Delegation manager 230 may then handle such a mistaken query message according to various methods known to those of skill in the art.

Pending route table 240 may be a device that stores information related to pending routing operations. Thus, pending route table 240 may include a machine-readable storage medium such as read-only memory (ROM), random-access memory (RAM), magnetic disk storage media, optical storage media, flash-memory devices, and/or similar storage media. For example, pending route table 240 may include an SRAM that stores a message while delegation manager 230 awaits a determination of a next hop. Exemplary contents of pending route table 230 will be described in greater detail below with respect to FIG. 4.

Longest prefix match (LPM) block 250 may include hardware and/or executable instructions on a machine-readable storage medium configured to determine an appropriate next hop for a given destination address and network device ID. For example, LPM block 250 may perform longest prefix matching against a stored portion of the distributed routing table. It will be apparent to those of skill in the art that any method of identifying a next hop from a routing table or portion thereof may be employed by LPM block 250. For example, in various alternative embodiments, LPM block may identify a next hop based on a full address match, rather than simply the longest prefix match. As illustrated, LPM block 250 may include filters 252, route retriever 254, and/or route table 256.

Filters 252 may include hardware and/or executable instructions on a machine-readable storage medium configured to perform preliminary processing to narrow down the field of possible results among route table 256. In various embodiments, filters 252 may be configured to estimate the length of the longest matching prefix for a given destination address. For example, filters 252 may store a number of Bloom filters that are each constructed from the prefixes of a common length stored in route table. Thus, one Bloom filter may be constructed from all stored prefixes of length "1," a second Bloom filter may be constructed from all stored prefixes of length "2," and so on. The Bloom filter associated with the longest prefix that also matches the destination address may indicate the estimated length of the longest matching prefix. Filters 252 may then pass this estimated length to route retriever for further resolution of the longest prefix match. It will be appreciated by those of skill in the art that various implementations of filters 252 may be possible. Thus, filters 252 may be implemented in software, such as in Bloom filters, and/or hardware, such as in a ternary content-addressable memory (TCAM). Exemplary contents of filters 252 will be described in greater detail below with respect to FIG. 5.

Route retriever 254 may include hardware and/or executable instructions on a machine-readable storage medium configured to identify a routing record that matches a destination address based on a longest matching prefix. In various embodiments, route retriever 254 may iterate through a number of routing records stored in route table, beginning with those storing the longest prefixes, until a longest matching prefix for the destination address is located. When filters 252 pass an estimated length of the longest matching prefix to route retriever 254, route retriever 254 may instead begin iterating through those records having prefixes of that same length, skipping those records with longer prefixes. Thus, when filters 252 estimates the length of the longest matching prefix, route retriever may narrow down the scope of records to be searched by skipping any records with longer prefixes. After locating a matching routing record, route retriever may extract the appropriate next hop in relation to a network device ID and return this next hop to delegation manager 230 for further processing.

Route table 256 may be a device that stores known routing paths for prefixes assigned to network device 200. Thus, route table 256 may include a machine-readable storage medium such as read-only memory (ROM), random-access memory (RAM), magnetic disk storage media, optical storage media, flash-memory devices, and/or similar storage media. For example, route table 256 may include a DRAM that stores various routing records including prefixes and associated next hops. Exemplary contents of route table 256 will be described in greater detail below with respect to FIG. 6.

Route manager 260 may include hardware and/or executable instructions on a machine-readable storage medium configured to receive and process route update messages. According to various embodiments, groups of network devices such as routers 140a-e may implement a route learning protocol to generate the distributed route table. For example, such group of network devices may implement BGP, OSPF, RIP, and/or other routing protocols. According to such protocols, network devices may transmit route update messages to advertise the destination addresses that may be reached through that network device. For example, returning to FIG. 1, router 140d may transmit a route update message to router 140a and/or router 140b indicating that destinations "/JDOE/PAPERS/PaperA.pdf," "/JDOE/PA- PERS/PaperB.pdf," and/or "JDOE/VIDEOS/abc.mpg" may be reached via router 140*d*. Upon receiving a route update message, route manager 260 may extract the destination address and pass the content name to delegation manager 230 to determine whether the route update message should be processed locally or at a remote device. Delegation manager 230 may make this determination according to a method that is similar to the determination of a network device to which a destination address is assigned, as described above. After receiving a response, route manager 260 may first determine whether the delegation manager has determined that the route update message should be processed locally. If so, route manager may update route table 256 in view of the route update message according to any method known to those of skill in the art. For example, route manager may create a new routing record in route table 256 including an appropriate prefix for the advertised destination address and, as a next hop, an indication of the device from which the update message arrived or an indication of the local interface via which the update message arrived.

If, on the other hand, delegation manager 230 determines that the route update message should be processed at a different network device, route manager may construct and transmit a delegated update message, including the destination and next hop, to the different network device. Route manager 260 may be further configured to handle similar delegated update messages received from other network devices. For example, when route manager, 260 receives a delegated update message via network interface 210, route manager 260 may extract the destination address and next hop from the message and query route table 256 for an appropriate routing record to update. After either locating such a routing record or creating a new record, route manager 260 may store the appropriate matching prefix and/or the indicated next hop with respect to the other network device in association with a network device ID of that network device. Thereafter, the network device 200 may be able to assist the other network device in routing messages destined for an address matching the stored prefix.

Figure 3:
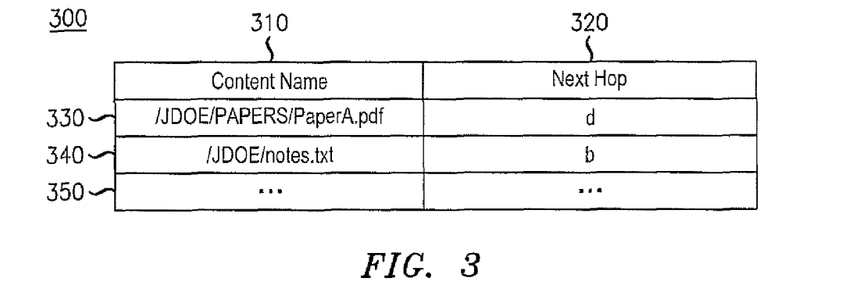
FIG. 3 illustrates an exemplary data arrangement for storing route cache data.

FIG. 3 illustrates an exemplary data arrangement 300 for storing route cache data. Data arrangement 300 may be implemented using a variety of data structures such as, for example, objects, arrays, linked lists, trees, and/or hash tables. Data arrangement 300 may be stored in, for example, route cache 220 of exemplary network device 200. Data arrangement 300 may include a number of fields such as content name field 310 and/or next hop field 320.

Content name field 310 may store a content name or other destination address. In various embodiments, content name field 310 may store a number of components of a content name. For example, if a content name includes a total of B components, the content name field 310 may include B-1 components. In some embodiments, this may entail simply stripping off any chunk identifiers from the content name prior to storage in content name field 310. In various embodiments, the value stored in content name field 310 may be stored in plaintext form or may be stored as a hash value. In various embodiments wherein content name field 310 stores a hash value, route cache 220 of network device 200 may be configured to perform a hash operation of the destination address of a received message and query data arrangement 300 for a matching hash value to determine whether there is a cache hit. Further modifications will be apparent to those of skill in the art. Next hop field 320 may store an identification of an outgoing interface or network device that will serve as a next hop for messages that match the associated value stored in content name field 310.

As an example, data arrangement 300 may indicate the contents of a route cache for router 140*a* of exemplary network 100. Cache entry 330 may indicate that messages including the destination address "/JDOE/PAPERS/Paper-A.pdf" should be forwarded to next hop "d," which may correspond to router 140*d*. Cache entry 340 may indicate that messages including the destination address "/JDOE/notes.txt" should be forwarded to next hop "b," which may correspond to router 140*b*. Data arrangement 300 may include numerous additional cache entries 300.

Figure 4:
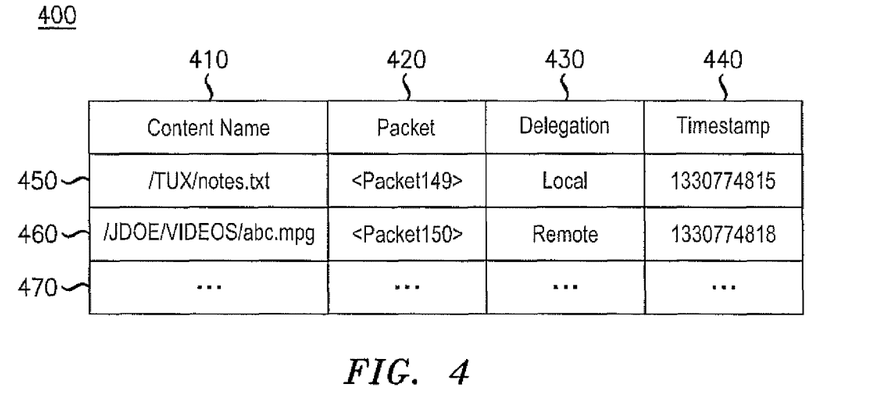
FIG. 4 illustrates an exemplary data arrangement for storing a pending route table.

FIG. 4 illustrates an exemplary data arrangement 400 for storing a pending route table. Data arrangement 400 may be implemented using a variety of data structures such as, for example, objects, arrays, linked lists, trees, and/or hash tables. Data arrangement 400 may be stored in, for example, pending route table 240 of exemplary network device 200. Data arrangement 400 may include a number of fields such as content name field 410, packet field 42, delegation field 430, and/or timestamp field 440.

Content name field 410 may store a content name or other destination address. In various embodiments, content name field 310 may store a number of components of a content name. For example, if a content name includes a total of B components, the content name field 310 may include B-1 components. In some embodiments, this may entail simply stripping off any chunk identifiers from the content name prior to storage in content name field 310. In various embodiments, the value stored in content name field 410 may be stored in plaintext form or may be stored as a hash value. In various embodiments wherein content name field 410 stores a hash value, delegation manager 230 of network device 200 may be configured to perform a hash operation of the destination address of a received message and query data arrangement 400 for a matching hash value to determine whether there is a matching pending route. Further modifications will be apparent to those of skill in the art.

Packet field 420 may store the message that is pending a routing operation. For example, when delegation manger 230 receives an indication of an appropriate next hop, either from LPM block 250 or from another network device, delegation manager may locate the appropriate pending route and forward the message stored in packet field 420 to the next hop. Delegation field 430 may store an indication as to whether longest prefix matching is being performed locally or at a remote network device. Timestamp field 440 may store a timestamp indicating when an entry was added to the data arrangement 400 and/or when the associated message was received at the local device. Various uses for these values will be apparent to those of skill in the art.

As an example, pending route record 450 may indicate that a packet "<Packet149>" was received at time "1330774815" and includes a destination address of "/TUX/notes.txt." This packet may currently be awaiting a local decision as to the appropriate next hop. As another example, pending route record 460 may indicate that a packet "<Packet150>" was received at time "1330774818" and includes a destination address of "/JDOE/VIDEOS/abc-.mpg." This packet may currently be awaiting a decision by a remote device as to the appropriate next hop. In various embodiments, pending route record 460 may correspond to message 150 of exemplary system 100. Data arrangement 400 may include numerous additional rending route records 470.

Figure 5:
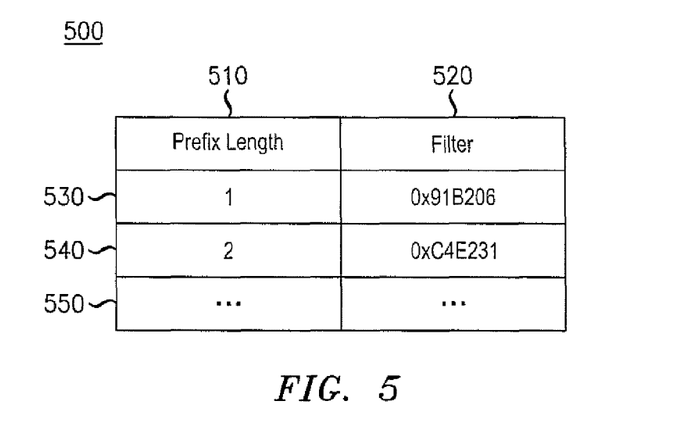
FIG. 5 illustrates an exemplary data arrangement for storing filters.

FIG. 5 illustrates an exemplary data arrangement 500 for storing filters. Data arrangement 500 may be implemented using a variety of data structures such as, for example, objects, arrays, linked lists, trees, and/or hash tables. Data arrangement 500 may be stored in, for example, filters 252 of exemplary network device 200. Data arrangement 500 may include a number of fields such as prefix length field 510 and/or filter field 520.

Prefix length field 510 may indicate the length of the prefixes used in constructing the associated filter, while filter field 520 may store the filter itself. As an example, filter record 530 may indicate that the filter "0x91B206" may be used to determine whether a prefix of length "1" may match a destination address currently being evaluated. As another example, filter record 540 may indicate that the filter "0xC4E231" may be used to determine whether a prefix of length "2" may match a destination address currently being evaluated. Data arrangement 500 may include numerous additional filter records 550.

In various embodiments, the filters stored in filter field 520 may be Bloom filters. Thus, each filter may be constructed by performing one or more hash functions on each stored prefix of the associated length. For example, "0x91B206" may have been generated by performing multiple hash functions on locally-stored prefix of length "1." These filters can then be compared to a hashed value produced from the destination address to determine whether it is possible that the local device stores a route record having a prefix of the associated length that matches the destination address. Then, the matching Bloom filter associated with the longest prefix length may indicate an estimate as to the longest locally-store prefix that matches the destination address. In performing further longest prefix matching, the network device may skip any prefixes longer than the estimated length.

Figure 6:
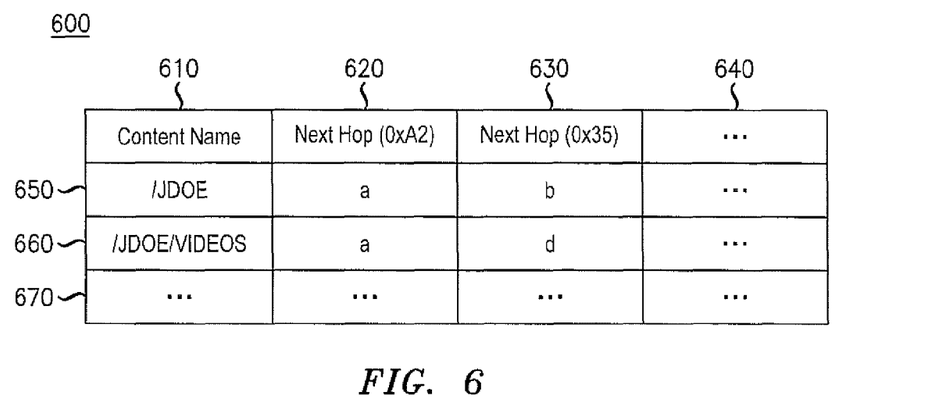
FIG. 6 illustrates an exemplary data arrangement for storing a route table.

FIG. 6 illustrates an exemplary data arrangement 600 for storing a route table. Data arrangement 600 may be implemented using a variety of data structures such as, for example, objects, arrays, linked lists, trees, and/or hash tables. Data arrangement 600 may be stored in, for example, route table 256 of exemplary network device 200. Data arrangement 600 may include a number of fields such as content prefix field 610 and a number of next hop fields 620, 630, 640.

Content prefix field 610 may store a content name or other destination address, and/or a portion thereof. In various embodiments, the value stored in content prefix field 610 may be stored in plaintext form or may be stored as a hash value. In various embodiments wherein content prefix field 610 stores a hash value, route retriever 254 of network device 200 may be configured to perform a hash operation of the destination address of a received message and query data arrangement 600 for a matching hash value to determine whether there is a matching route. Further modifications will be apparent to those of skill in the art.

Next hop field 620 may store a next hop with respect to a particular network device. For example, as illustrated, next hop field 620 may store a next hop with respect to a network device associated with the network device ID "0xA2." Next hop field 630 may store a next hop with respect to a different network device. For example, as illustrated, next hop field 630 may store a next hop with respect to a network device associated with the network device ID "0x35." Data arrangement 600 may include numerous additional next hop fields 640 for accommodating additional network devices.

As an example, route record 650 may indicate that a message for which the prefix "/JDOE" is the longest matching prefix should be forwarded to next hop "a," if the network device forwarding the message associated with network device ID "0xA2", or to next hop "b," if the network device forwarding the message associated with the network device ID "0x35." As another example, route record 660 may indicate that a message for which the prefix "/JDOE/VIDEOS" is the longest matching prefix should be forwarded to next hop "a," if the network device forwarding the message associated with network device ID "0xA2", or to next hop "b," if the network device forwarding the message associated with the network device ID "0x35." Data arrangement 600 may include numerous additional route records 670.

Figure 7:
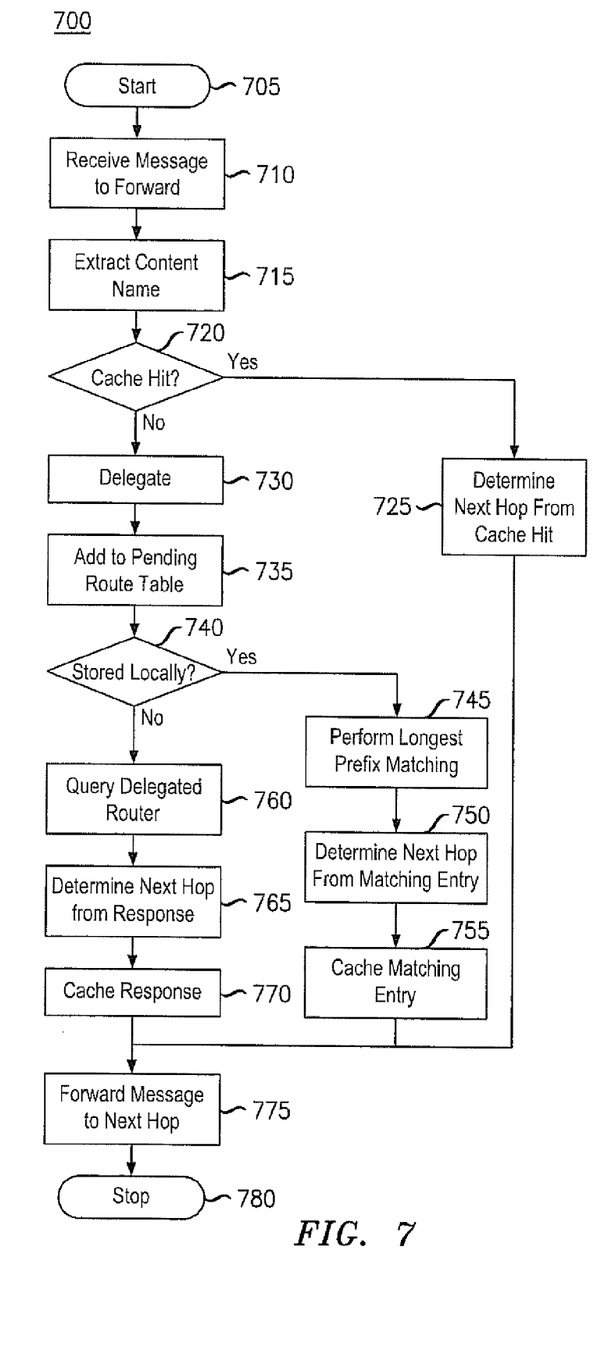
FIG. 7 illustrates an exemplary method for forwarding a message.

FIG. 7 illustrates an exemplary method 700 for forwarding a message. Method 700 may be performed by the components of a router or other network device such as, for example, network device 200. Method 700 may be performed among route cache 220, delegation manager 230, and/or LPM block 250.

Method 700 may begin in step 705 and proceed to step 710 where the network device may receive a message that should be forwarded to a next hop. The network device may extract a content name or a portion thereof from the message in step 715 and then determine whether the content name matches any cache entries in step 720. In various embodiments, the extracted content name portion may include the first B-1 components, where the content name is B components long. If there is a cache hit, the network device may read the appropriate next hop from the matching cache entry in step 725 and proceed to step 775. Otherwise, method 700 may proceed from step 720 to step 730 where the network device may perform a delegation function to determine whether the network device or a remote network device is assigned to the content name. An exemplary method of performing such a delegation process will be described in greater detail below with respect to FIG. 10.

Next, in step 735, the network device may add the message to a pending route table for future forwarding. The network device may then, in step 740, determine whether the outcome of the delegation procedure indicates that an applicable route record for the content name would be stored locally or that the content name is otherwise assigned to the local device. If so, the network device may proceed to perform appropriate local processing by performing longest prefix matching in step 745 against the locally stored route table. After finding a matching route record, method 700 may proceed to step 750, where the network device may use the matching route record to determine the appropriate next hop. In step 755, the network device may cache the matching entry for facilitating future access. Caching the matching entry may include storing the entire route record in the route cache or generating a new cache entry based on at least some of the values stored in route record. Method 700 may then proceed to step 775.

If, on the other hand, the network device determines in step 740 that the content name is stored to a remote network device, method 700 may proceed to step 760. In step 760, the network device may query the delegated router for the appropriate next hop. For example, the network device may construct a query message including the content name, transmit the query message, and wait for a response. In various embodiments, the network device may continue to process other messages while awaiting this response. After receiving a response, the network device may determine the appropriate next hop based on the response. Next, in step 770, the network device may cache the response for facilitating future access. Caching the matching entry may include storing the entire response in the route cache or generating a new cache entry based on at least some of the values stored in response. Method 700 may then proceed to step 775.

In step 775, the network device may forward the message to the next hop determined in step 725, step 750, and/or step 765. Method 700 may then proceed to end in step 780.

Figure 8:
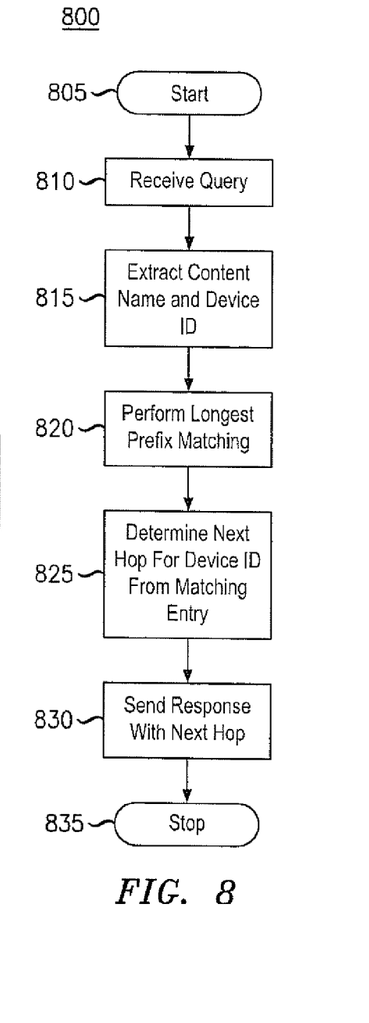
FIG. 8 illustrates an exemplary method for assisting another device in forwarding a message.

FIG. 8 illustrates an exemplary method 800 for assisting another device in forwarding a message. Method 800 may be performed by the components of a router or other network device such as, for example, network device 200. Method 800 may be performed among delegation manager 230 and/or LPM block 250.

Method 800 may begin in step 805 and proceed to step 810 where the network device may receive a query from another network device for an appropriate next hop. The network device may then, in step 815, extract the content name and querying device ID from the content message and/or other information related to receipt of the query message. Next, in step 820, the network device may perform longest prefix matching to locate a matching record stored in the route table. This step may be similar to step 745 of method 700. After locating a matching route record, the network device may determine the next hop based on an entry of the route record that matched the device ID of the querying device. The network device may then construct and send a response message to the querying device. This response may include the next hop determined in step 825 and the requested destination address. Method 800 may then proceed to end in step 835.

Figure 9:
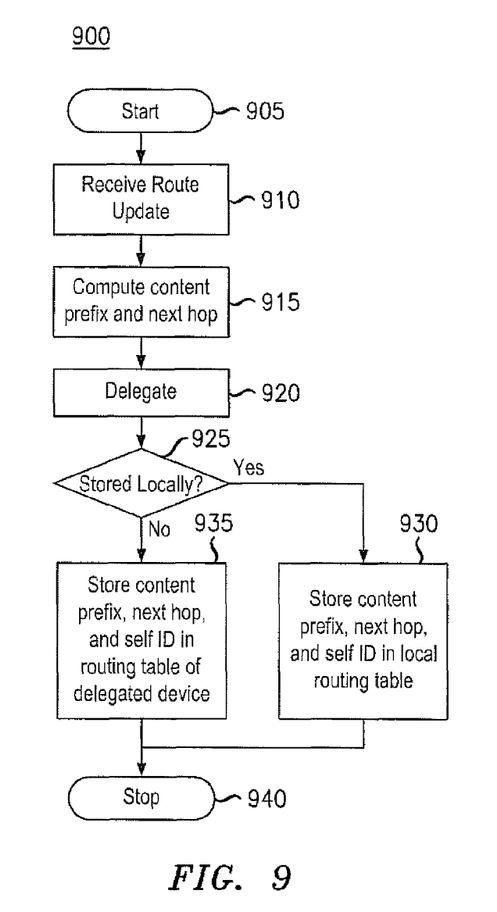
FIG. 9 illustrates an exemplary method for processing a route update.

FIG. 9 illustrates an exemplary method 900 for processing a route update. Method 900 may be performed by the components of a router or other network device such as, for example, network device 200. Method 900 may be performed among delegation manager 230, and/or route manager 260.

Method 900 may begin in step 905 and proceed to step 910 where the network device may receive a route update message. Next, in step 915, the network device may compute the prefix and/or next hop associated with the update message. For example, the network device may extract a destination address or prefix from the message and note the interface on which the update message was received. In various alternative embodiments, the network device may not compute a prefix at step 915 and, instead, may simply extract the destination address. In such embodiments, the prefix may be computed at steps 930 and 935 and may be computed by a remote network device that will store the route record.

In step 920 the network device may perform a delegation function to determine whether the network device or a remote network device is assigned to the content name. An exemplary method of performing such a delegation process will be described in greater detail below with respect to FIG. 10. In various embodiments, step 920 may correspond to step 730 of method 700.

In step 925, the network device may determine whether the outcome of the delegation function indicates that the information in the route update message should be stored locally. If so, the method 900 may proceed to step 930 where the network device may generate a new route record or update an existing route record to include the address prefix, next hop, and the device ID of the network device. Otherwise, the method 900 may proceed to step 935, where the network device may store the address prefix, next hop, and the device ID of the network device on the appropriate remote network device. This may include constructing and transmitting a delegated update message to the remote network device. Method 900 may then proceed to end in step 940.

Figure 10:
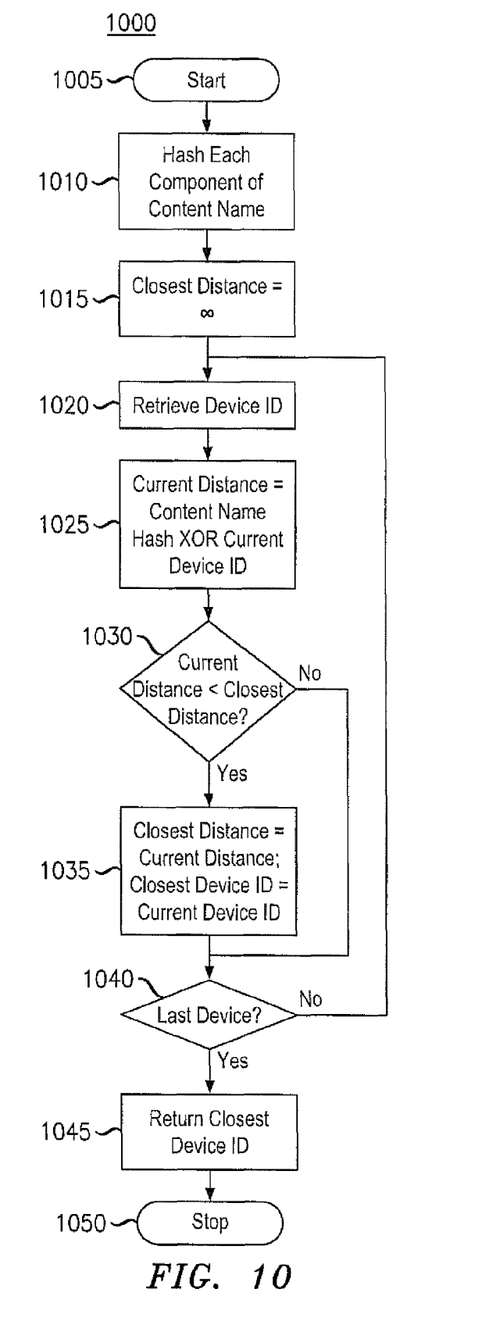
FIG. 10 illustrates an exemplary method for delegating a routing operation.

FIG. 10 illustrates an exemplary method 1000 for delegating a routing operation. Method 1000 may be performed by the components of a router or other network device such as, for example, network device 200. Method 1000 may be performed by delegation manager 230.

Method 1000 may begin in step 1005 and proceed to step 1010 where the network device may hash each component of the content name. In various embodiments, step 1010 the network device may break the content name into a number of components, hash each component independently, and then combining the components to form a hash key. In various embodiments, this combination may include concatenating each of the hashed components according to the order of the components in the content name. For example the network device may break the content name "/JDOE/VIDEOS/abc.mpg" into three components: "JDOE," "VIDEOS," and "abc.mpg." Then, the network device may hash each component individually, to produce values "0xA2," "0x21," and "0x8E." Finally, the network device may concatenate the values to produce a hash key "0xA2218E."

Next, in step 1015, the network device may initialize the procedure by setting a "closest distance" variable to null, infinity, or some other high value. Then, in step 1020, the network device may retrieve a router ID to evaluate. In step 1025, the network device may determine how close the current router ID is to the hash key. For example, the network device may first pad a number of zeros to the right of the network ID so that it is the same length as the hash key. The network device may determine the "distance" by performance an XOR function between the hash key and network device ID. For example, if the hash key is "0xA22180" and the router ID is "0x35," this distance may be "0x972180." As another example, if the hash key is "0xA2," this distance may be "0x002180."

After determining the distance for the current network device ID, the network device may, in step 1030, determine whether the current distance is the new shortest distance by comparing the value to the "closest distance" variable. If so, the network device may update the "closest distance" variable and make note of the current device ID as being the current "closest device ID." Next, in step 1040, the network device may determine whether there are no more device IDs to process. If additional device IDs remain, method 1000 may loop back to step 1020. Otherwise, method 1000 may proceed to step 1045 where the network device may return the device ID stored in the "closest device ID" variable for use by the element that invoke method 1000. Thus, the returned device ID may indicate a device to which a particular destination address is assigned for method 700 and/or method 900. Method 1000 may then proceed to end in step 1050.

In various alternative embodiments, method 1000 may determine one or more "backup" devices to which a device address is assigned that are to be used when one or more network devices are unresponsive or otherwise cannot be used. According to various such embodiments, the method 1000 may identify the N closest network device IDs, where N is a number greater than 1. Various additional modifications for implementing such functionality will be apparent to those of skill in the art. For example, the network device may be further configured to forward delegated update messages to each backup device. Further, the network device may be configured to query one of the backup devices when the primary device to which an address is assigned cannot be queried.

According to the foregoing, it should be apparent that various embodiments enable the efficient use of large routing tables to route messages. For example, by distributing the routing table among multiple network devices, the task of next hop lookup may be distributed among such devices, thereby providing an efficient means to support a large routing table. Further, by assigning a subset of destination addresses to each of a number of network devices, next hop lookups can be delegated in an efficient and reliable manner.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method performed by a first network device for forwarding a message, the method comprising:
   receiving, at the first network device, a message to be forwarded;
   determining a destination address for the message;
   determining whether that the destination address is not assigned to the first network device;
   when responsive to the determination that the destination address is not assigned to the first network device, querying a second network device for a next hop of the destination address;
   receiving, in response to the query, an indication of the next hop for the destination address; and
   forwarding, by the first network device in response to the indication of the next hop, the message to the next hop,
   wherein the step of determining whether that the destination address is not assigned to the first network device comprises:
      performing a hash function on the destination address to produce a hash key;
      identifying a, network device identification (ID) of a plurality of network device IDs that is closest to the hash key; and
      determining whether that the identified network device ID is not associated with the first network device.

2. The method of claim 1, wherein the identified network device ID is associated with the second network device.

3. The method of claim 1, wherein the step of performing a hash function comprises: identifying a first component and a second component of the destination address; hashing the first component; hashing the second component independently of the step of hashing the first component; and combining at least the hashed first component and the hashed second component to produce the hash key.

4. The method of claim 1, further comprising:
   determining whether that the first network device stores lacks a cache entry in association with the destination address; and
   adding a new cache entry, at the first network device in response to the indication of the next hop, in association with the destination address and based on the indication of the next hop,
   wherein the step of determining whether that the destination address is not assigned to the first network device is performed responsive to the determination that the first network device lacks a cache entry in association with the destination address when the first network device does not store a cache entry in association with the destination address.

5. The method of claim 1, wherein the destination address is a content name.

6. The method of claim 1, further comprising:
   adding the message to a pending route table; and
   retrieving the message from the pending route table in response to receiving the indication of the next hop for the destination address.

7. The method of claim 1, further comprising:
   receiving, at the first network device, a route update message, wherein the route update message includes the destination address;
   identifying a next hop, for the first network device, associated with the route update message;
   determining, in response to receiving the route update message, whether that the destination address is not assigned to the first network device; and
   responsive to the determination that the destination address is not assigned to the first network device, transmitting the next hop and destination address to the second network device.

8. A network device comprising:
   a network interface configured to receive a message; and
   a delegation manager processor configured to:
      determine a destination address associated with the message;
      determine whether that the destination address is not assigned to the network device by:
         performing a hash function on the destination address to produce a hash key;
         identifying a network device identification (ID) of a plurality of network device IDs that is closest to the hash key; and
         determining whether that the identified network device ID is not associated with the network device;
      responsive to the determination that the destination address is not assigned to the network device, query a second network device, via the network interface, for a next hop of the destination address;

receive, in response to the query and via the network interface, an indication of the next hop for the destination address; and forward, in response to the indication of the next hop, the message to the next hop via the network interface.

9. The network device of claim 8, wherein the identified network device ID is associated with the second network device.

10. The network device of claim 8, wherein, in performing a hash function, the delegation manager processor is configured to: identify a first component and a second component of the destination address; hash the first component; hash the second component independently of the step of hashing the first component; and combine at least the hashed first component and the hashed second component to produce the hash key.

11. The network device of claim 8, further comprising:
a route cache configured to:
determine whether that the route cache stores lacks a cache entry in association with the destination address, and
add a new cache entry, in response to the indication of the next hop, in association with the destination address and based on the indication of the next hop;
wherein the delegation manager processor is configured to determine whether that the destination address is not assigned to the network device in response to the route cache determining that the route cache does not store lacks a cache entry in association with the destination address.

12. The network device of claim 8, wherein the destination address is a content name.

13. The network device of claim 8, further comprising:
a pending route table that stores the message while the delegation manager processor awaits the indication of the next hop for the destination address.

* * * * *